April 30, 1935.                C. B. KING                1,999,414
       ELECTRIC GROUNDING APPARATUS FOR MOTOR TANK TRUCKS
                 Filed April 29, 1933      2 Sheets-Sheet 1
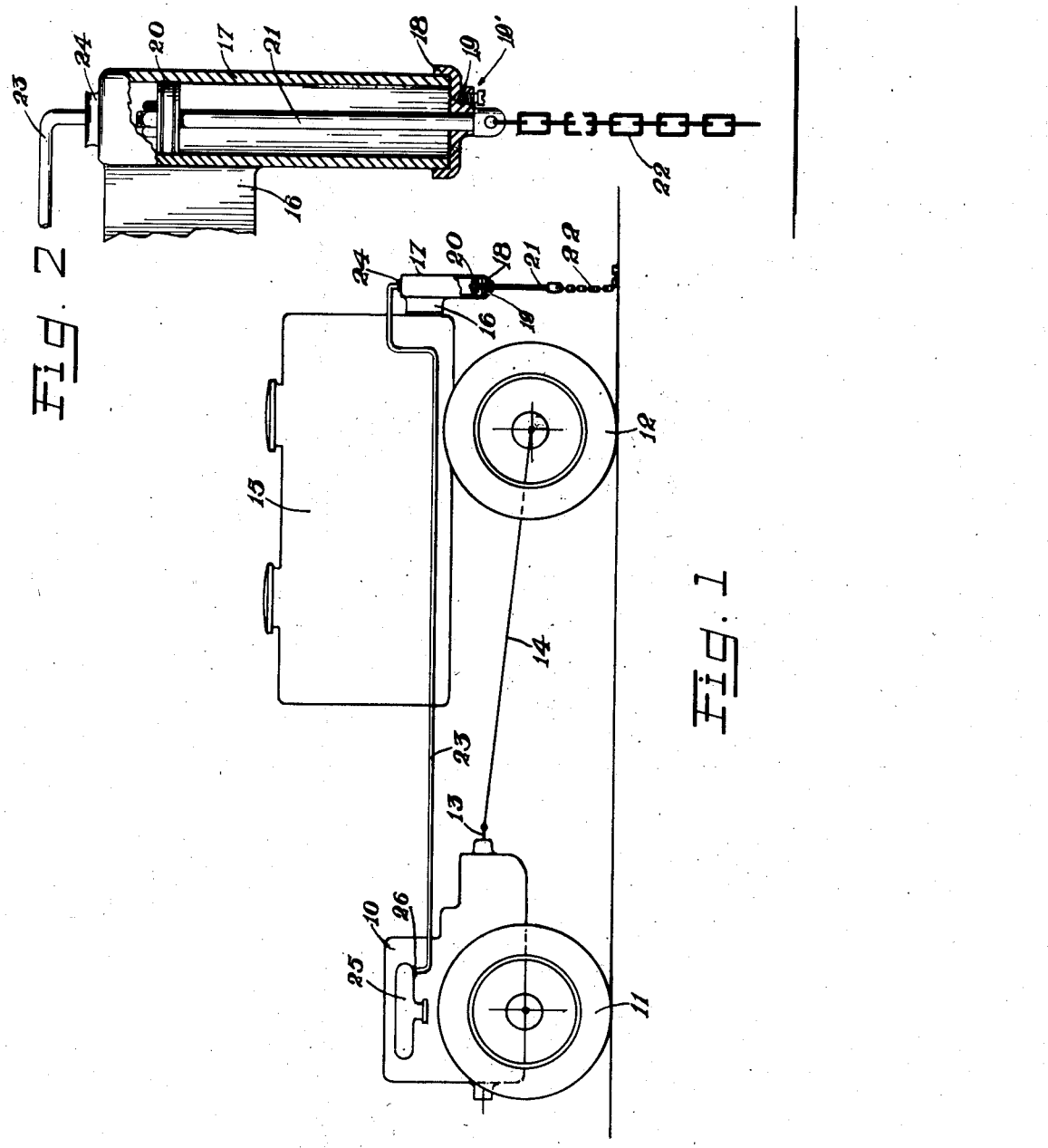
INVENTOR.
Charles B. King
BY
Watson, Bristol, Johnson & Leavenworth
ATTORNEYS April 30, 1935. C. B. KING 1,999,414
ELECTRIC GROUNDING APPARATUS FOR MOTOR TANK TRUCKS
Filed April 29, 1933 2 Sheets-Sheet 2
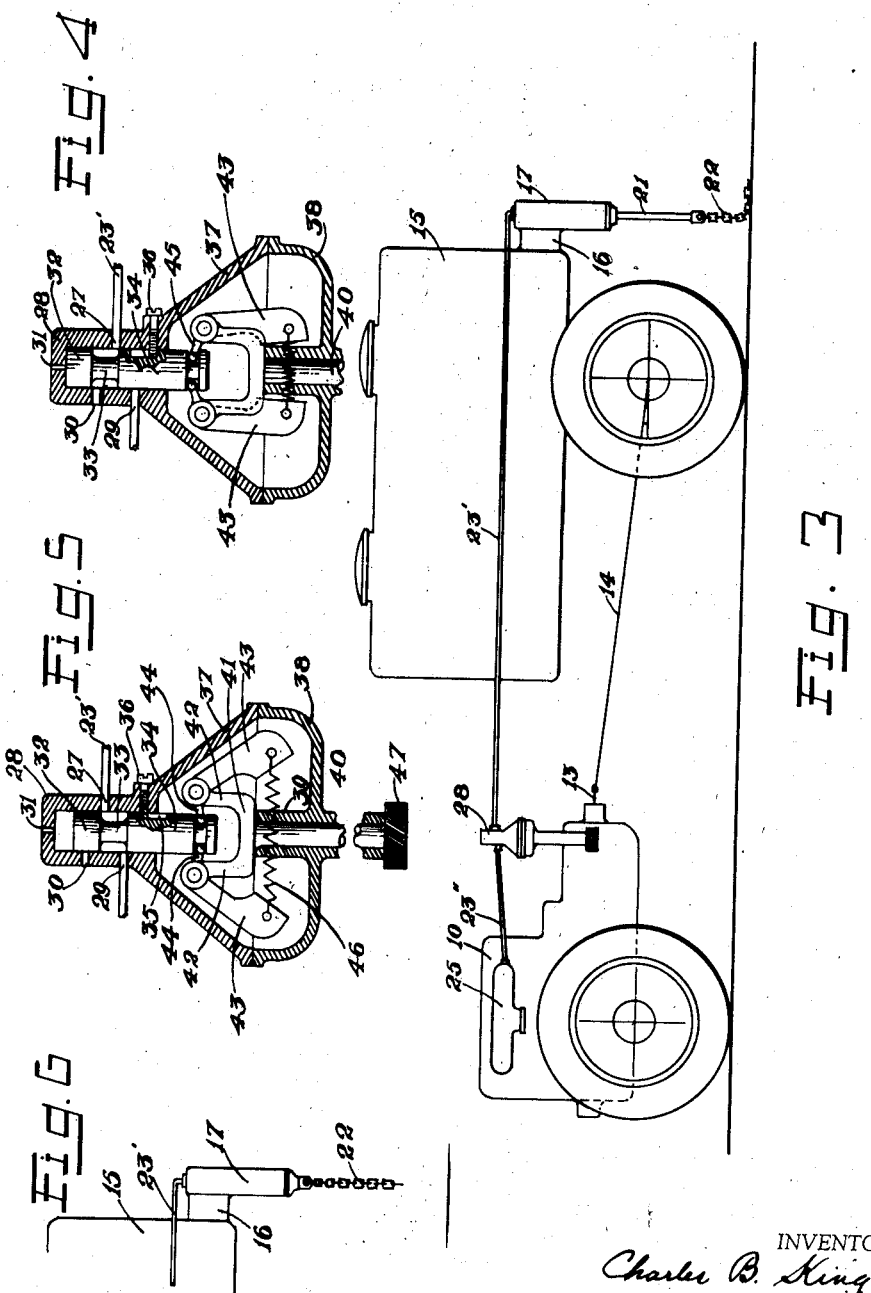
INVENTOR.
Charles B. King
BY
Watson, Bristol, Johnson & Leavenworth
ATTORNEY.S Patented Apr. 30, 1935

1,999,414

UNITED STATES PATENT OFFICE 1,999,414

ELECTRIC GROUNDING APPARATUS FOR MOTOR TANK TRUCKS

Charles B. King, Larchmont, N. Y.

Application April 29, 1933, Serial No. 668,547

15 Claims. (Cl. 175—264)

The present invention relates to apparatus for grounding the chassis and tanks of motor trucks carrying volatile and imflammable hydrocarbons or other readily combustible materials, and has for a general object the provision of such apparatus which is efficient and dependable, operable automatically to insure grounding when the truck is receiving or delivering its combustible load and reduces to a minimum the wear on the grounding member when the truck is in motion.

A more specific object of the invention is the provision of such apparatus which may utilize power from the truck motor, preferably vacuum operated therefrom, to retract the grounding member from contact with the ground when the truck is put in motion.

Another object of the invention is the provision of such apparatus wherein the grounding member is connected to a piston disposed within a cylinder connected by a pipe line to a device adapted to create a vacuum, preferably the manifold of the engine, so that when a vacuum is created in the cylinder of the device the grounding member will be retracted and held out of contact with the ground; and when the cylinder is connected to the manifold of the motor the grounding member will be retracted from contact with the ground when the motor is under running conditions such as to create a vacuum in the cylinder.

A still further object of the invention is the provision of such apparatus which includes a device operated through mechanism geared to at least one of the wheels, preferably the drive shaft, so that a valve in the pipe line will allow a retraction of the grounding member by power from the truck motor only when the truck is traveling.

Other objects of the invention will in part be obvious and will in part appear hereinafter.

The invention accordingly comprises the features of construction, combination of elements, and arrangement of parts, which will be exemplified in the construction hereinafter set forth and the scope of the invention of which will be indicated in the claims.

For a fuller understanding of the nature and objects of the invention reference should be had to the following detailed description taken in connection with the accompanying drawings, in which:

Fig. 1 is a side elevational schematic view with parts broken away of a truck showing the parts of one form of the apparatus of the present invention and the relative position of the parts thereof when the truck is standing still;

Fig. 2 is a partial view with parts broken away of parts of the apparatus of the present invention depicted in Fig. 1, showing the relative positions thereof when the truck is traveling;

Fig. 3 is a view similar to Fig. 1 depicting a modified form of the apparatus of the present invention and the relative positions of parts thereof when the truck is standing still;

Fig. 4 is a detailed sectional view of a device forming part of the apparatus depicted in Fig. 3, showing the relative positions of the parts thereof when the truck is standing still;

Fig. 5 is a view similar to Fig. 4 showing the relative positions of the parts of the device when the truck is traveling; and Fig. 6 is a view similar to Fig. 2 showing the position of the grounding member when the parts of the device depicted in Figs. 4 and 5 are in the relative positions depicted in Fig. 5.

It has been found in practice that a static electric charge of considerable voltage is generated and held by the tanks and metal chassis parts of motor trucks for the transportation of volatile and imflammable hydrocarbons. This charge may be built up by friction of the fluids passing through filling pipes into the tanks, delivery pipes from the tanks, and movement of the body of fluid against the walls of the tanks of the trucks, such as that which is common during the transportation of the fluids. Such trucks are normally insulated from the ground by their rubber tires. There is thus danger that fire and dangerous explosions will be caused by discharge of the accumulated electric charge when filling pipes are brought near the tank, or metal delivery hoses are brought in proximity to receiving tanks. It has thus become necessary to use a grounding member usually consisting of a chain attached to the truck chassis and adapted to contact with or drag on the ground.

The use of such a chain has been a source of many difficulties. Wear is great and replacement must be frequent. An unnoticed shortening of the chain due to rapid wear frequently prevents the chain contacting with the ground. A chain fore-shortened by wear in many instances may be long enough to contact with the ground when the truck springs are depressed by a heavy load but of insufficient length to make contact with the ground as the load becomes lightened or when a light load is carried giving rise to the hazards mentioned above. In addition a dragging chain, while traveling over abrasive surfaces of road beds of common type, will produce sparks which may ignite inflammable liquids accumulated on the highway. In cities where underground third rails are used by electric traction companies such dragging chains frequently become wedged in the trolley slot. This may result in breakage of the chain and through contact between the chain segment and the third rail in a consequent short circuit.

These and other difficulties of the prior art are efficiently avoided by the present invention wherein a grounding member is retracted from contact with the ground while the truck is traveling and allowed to make contact with the ground when the truck comes to a stop to discharge static electricity before danger of ignition can arise. As a further advantage, when the truck is traveling it is usually insulated from the ground by the rubber tires which render the truck immune to the dangers of being struck by lightning and of contacts with falling and sagging charged electric conductors.

The grounding member is preferably operated by power from the truck motor. In accordance with one modification when the motor is stopped the contacting member is allowed to drop by gravity into contact with the ground. Such structure is depicted in Fig. 1 wherein the usual chassis supporting the truck motor 10 is mounted upon the usual pairs of front wheels 11 and rear wheels 12. 13 indicates the jack shaft connected to the propeller shaft 14 for driving the rear wheels. The usual tank for transporting hydrocarbons is indicated at 15.

Mounted on the truck chassis or the tank 15 is a metallic bracket 16 supporting a metallic cylinder 17, the lower end of which is closed by a cap 18 provided with an air hole 19. Referring more particularly to Fig. 2, disposed within the cylinder 17 is a piston head 20 to which is secured a metallic rod 21 connected to a metallic contacting member or drag chain 22. The piston head 20 is fitted closely to the side walls of the cylinder 17. As shown in Fig. 1, a pipe line 23 is connected to the upper end of the cylinder 17 by an air-tight fitting 24 and to the manifold 25 of the truck motor 10 by a fitting 26.

When the truck motor is started, the vacuum created by the manifold withdraws the air from the cylinder 17, causing the piston head 20 to move upwardly to the position depicted in Fig. 2, thereby retracting the contacting member 22 from contact with the ground. When the truck motor is stopped or operated in a manner to allow loss of the vacuum created in the line 23 the piston head 20, the piston rod 21, and the contacting member 22 fall by the action of gravity so that the contacting member makes contact with the ground. The chassis and tank of the truck are thus electrically connected with the ground when the motor is not running. The static charge collected on the chassis and tank becomes dissipated before the filling pipe or hose is brought adjacent to the tank and before the dischage hose of the tank is brought adjacent to a receiving tank.

In some instances the truck motor, or an auxiliary motor from which the present device may be operated, is utilized to pump the fluid hydrocarbon in making deliveries. The structure of the apparatus depicted in Fig. 1 would thus prevent the grounding member from contacting the ground before delivery is made. In such cases, the apparatus depicted in Figs. 3, 4, 5 and 6 is preferably utilized to insure a contact between the ground and the grounding member when the truck comes to a stop.

In accordance with this modification of the invention cylinder 17 is connected by a pipe 23' to one port 27 in the casing 28 of a piston-slide valve. The valve casing 28 is additionally provided with a port 29, a port 30 and a breather hole 31. A sliding valve 32 is provided with a restricted portion 33 so that the port 27 may alternately communicate with ports 29 and 30 when the valve 32 is reciprocated. The breather hole 31 prevents the formation of an air cushion in the end of the casing thereby allowing free action of the valve 32. The valve 32 is also provided with an extension 34 having a slot 35 in the side wall thereof. A projecting member 36, preferably a bolt through the wall of the casing, cooperates with the slot 35 to form a pair of stops to limit the reciprocal movement of the valve 32.

The piston-slide valve is preferably operated by a governor connected to the extension 34 in any suitable manner, the governor being geared to a rotating part connected with any of the wheels, such as a jack shaft or the propeller shaft 13, the drive shaft 14, the speedometer shaft or any other device which rotates with any of the wheels.

As shown in Figs. 4 and 5, the upper half 37 of a governor casing is made integral with the casing 28 of the piston-slide valve. The lower half 38 cooperates therewith to house a governor of well recognized type. A hollow governor shaft support 39 is preferably made integral with the lower casing half 38. Within the hollow support 39 is rotatably mounted a governor shaft 40 having a head 41 provided with a pair of arms 42—42 which pivotally support a pair of governor members 43—43, each having an operating finger 44 made integral therewith. As depicted, fingers 44—44 are disposed within a groove 45 formed in the end of the extension 34 of the valve head 32. A spring 46 is preferably connected between weighted ends of the governor members 43—43 so that the sliding valve 32 will be held in the position depicted in Fig. 4 when the governor shaft 40 is not rotated. A pinion 47 on the end of the governor shaft 40 is preferably geared to the propeller shaft 13.

When the truck is traveling and the propeller shaft 13 is rotating, the governor shaft 40 is rotated by the propeller shaft 13 and carries with it the governor members 43—43. These are caused to separate against the tension of the spring 46 by centrifugal action as depicted in Fig. 5 causing the slide valve 32 to be pulled down into the position shown so that the port 27 communicates with the port 29. The port 29 is connected to the manifold 25 of the motor 10 by pipe 23", but may be connected to any other vacuum creating device. In accordance with the preferred form, while the truck is traveling a vacuum is usually created in the cylinder 17 causing the grounding member 22 to be retracted from contact with the ground as depicted in Fig. 6. When the truck stops gravity assisted by the spring 46 returns the governor members 43—43 to the position shown in Fig. 4, causing the sliding valve 32 to assume the position shown in Fig. 4, allowing the port 27 to communicate with the open port 30. The vacuum in the cylinder 17 is thus destroyed and the grounding member 22 is allowed to fall into contact with the ground as shown in Fig. 3.

The air-hole 19 is provided for the purpose of releasing the air in the lower part of the cylinder 17 which would otherwise retard the lowering of the chain 22, as soon as the piston 20 had ceased to receive support from the existence of a vacuum above said piston. By making the air-hole 19 of large size the chain 22 will therefore drop promptly whenever the motor has ceased to operate, and even during temporary intervals in the motion of the truck when the existence of a steep grade causes the throttle to be opened widely. By having the air-hole 19 sufficiently small, the air cushion below the piston will prove sufficient to maintain the chain in elevated position during even such temporary intervals. If desired, the size of the air-hole 19 may be made adjustable by a manually operable member 19', seated within said air-hole and of any conventional construction.

If it is desired to keep the chain out of contact with the ground during all or substantially all the time the truck is in motion, this may be accomplished also by enlarging the area in the cylinder or an auxiliary vacuum tank between the engine and the piston head. Similarly, if it is desired to assure contact of the chain at times when a wide open throttle relieves the vacuum, this may be accomplished also by increasing the size or weight of the piston.

It is obvious that apparatus other than that depicted and specifically described may be utilized to perform the same function without departing from the scope of the invention. A power driven device connected with the truck motor or other power driven parts of the truck may be used to create a vacuum for operation of the cylinder and piston. Furthermore, a motor operated device may be used to operate through mechanical means a grounding member. A grounding member may be controlled in its operation by other fluid operated devices, for example an air pressure device wherein an increase in pressure created by a motor operated device will lift the grounding member out of contact with the ground. Likewise control means other than the governor and piston-slide valve shown may be used to control the operation of the device adapted to move the ground contacting member out of contact with the ground.

The forms of the invention depicted, however, are preferred due to their simplicity, dependability and relatively low cost. Furthermore, by the use of the forms depicted, dangers due to damage to the apparatus which would cause it to become inoperative are avoided since leakage in the pipe line, its connections, or the cylinder 17 allows the grounding member 22 to fall by gravity into contact with the ground and remain in contact therewith until the defect is observed and corrected.

It will thus be seen that the objects set forth above are efficiently attained.

Having described my invention, what I claim as new and desire to secure by Letters Patent, is:

1. Electric grounding apparatus for motor trucks comprising a grounding member, vacuum operated means to retract and hold said member out of contact with the ground, and means adapted to be associated with the motor of a truck to create a vacuum when the motor is running.

2. Electric grounding apparatus for motor trucks comprising a grounding member, a cylinder, a piston disposed therein and connected to said grounding member, and means adapted to be associated with the motor of a truck and said cylinder to withdraw the air from the latter while the motor is running so that at such time said grounding member will be retracted and held out of contact with the ground.

3. Electric grounding apparatus for motor trucks comprising a grounding member, a cylinder, a piston disposed therein and connected to said grounding member, a pipe line connected to said cylinder and adapted to be connected to the manifold of the motor of a truck to withdraw the air from said cylinder while the motor is running so that at such time said grounding member will be retracted and held out of contact with the ground.

4. Electric grounding apparatus for motor trucks comprising a grounding member, means to retract said member from contact with the ground adapted to be operated by power from the motor of a truck, and means to render said first mentioned means inoperative when the truck is standing still.

5. Electric grounding apparatus for motor trucks comprising a grounding member, means to retract said member from contact with the ground adapted to be fluid-operated by power from the motor of a truck, and means to render said fluid-operated means inoperative when the truck is standing still.

6. Electric grounding apparatus for motor trucks comprising a grounding member, means to retract said member from contact with the ground adapted to be operated by a vacuum created by the operation of the motor of a truck, and means to prevent the motor-created vacuum from operating said first mentioned means when the truck is standing still.

7. Electric grounding apparatus for motor trucks comprising a grounding member, a cylinder, a piston disposed therein and connected to said grounding member, means adapted to be associated with the motor of a truck and connected to said cylinder to withdraw the air from the latter while the motor is running so that at such time said grounding member will be retracted and held out of contact with the ground, and means to render said first mentioned means inoperative when the truck is standing still.

8. Electric grounding apparatus for motor trucks comprising a grounding member, a cylinder, a piston disposed therein and connected to said grounding member, a pipe line connected to said cylinder and adapted to be connected to the manifold of the motor of a truck to withdraw air from said cylinder while the motor is running so that at such time said grounding member will be retracted and held out of contact with the ground, and a valve in said pipe line to prevent the creation of a vacuum in said cylinder when the truck is standing still.

9. Electric grounding apparatus for motor trucks comprising a grounding member, a cylinder, a piston disposed therein and connected to said grounding member, a pipe line connected to said cylinder and adapted to be connected to the manifold of the motor of a truck to withdraw the air from said cylinder while the motor is running so that at such time said grounding member will be retracted and held out of contact with the ground, a valve in said line to allow said cylinder to be alternately connected with the manifold of the motor and the atmosphere, and means adapted to be actuated by truck travel to operate said valve so that said cylinder can be connected to the manifold of the truck when the truck is traveling and connected with the atmosphere when the truck is standing still.

10. Electric grounding apparatus for motor trucks comprising a grounding member, a cylinder, a piston disposed therein and connected to said grounding member, a pipe line connected to said cylinder and adapted to be connected to the manifold of the motor of a truck, a two-way valve in said pipe line to allow said cylinder to be alternately connected to the manifold of the motor and the atmosphere, and a governor to operate said valve so that said cylinder can be connected with the manifold of the motor when the truck is traveling and connected with the atmosphere when the truck is standing still.

11. Electric grounding apparatus for motor trucks comprising a grounding member, a cylinder, a piston disposed therein and connected to said grounding member, a pipe line connected to said cylinder and adapted to be connected to the manifold of the motor of a truck, a two-way valve in said pipe line to allow said cylinder to be alternately connected to the manifold of the motor and the atmosphere, and a governor to operate said valve adapted to be driven from a device which rotates when the truck wheels rotate so that said cylinder can be connected with the manifold of the motor when the truck is traveling and connected with the atmosphere when the truck is standing still.

12. In combination with the motor of a truck, an electric grounding apparatus comprising a grounding chain, a cylinder, a piston disposed therein and connected to said grounding chain, a piston-slide valve having three ports, a pipe line connected between one port and said cylinder, a pipe line connected between the manifold of the motor and another of said ports, a governor geared to the wheel drive of the truck adapted to operate said slide valve so that the two first mentioned ports communicate when the truck is traveling and the first mentioned port will communicate with the third port open to the atmosphere when the truck is standing still.

13. In combination with the motor of a truck, an electric grounding apparatus comprising a grounding member, and means fluid-operated by the truck motor to retract and hold said member out of contact with the ground under some conditions of motor operation while the truck is traveling.

14. Electric grounding apparatus for motor trucks comprising a grounding member and means operated by a vacuum to retract and hold said member out of contact with the ground under some conditions of motor operation while the truck is traveling.

15. Electric grounding apparatus for motor trucks comprising a grounding member, means to retract and hold said member out of contact with the ground operated by a flow of fluid, and means associated with the motor of a truck to create the flow of fluid while the motor is running.

CHARLES B. KING.